US007795812B2

(12) United States Patent
Kim

(10) Patent No.: US 7,795,812 B2
(45) Date of Patent: Sep. 14, 2010

(54) PLASMA DISPLAY DEVICE WITH MAGNESIUM OXIDE (MGO) PROTECTIVE LAYER

(75) Inventor: Ki-Dong Kim, Yongin-si (KR)

(73) Assignee: Samsung SDI Co., Ltd., Yongin (KR)

( * ) Notice: Subject to any disclaimer, the term of this patent is extended or adjusted under 35 U.S.C. 154(b) by 353 days.

(21) Appl. No.: 12/050,327

(22) Filed: Mar. 18, 2008

(65) Prior Publication Data

US 2008/0231189 A1 Sep. 25, 2008

(30) Foreign Application Priority Data

Mar. 21, 2007 (KR) ..................... 10-2007-0027724

(51) Int. Cl.
*H01J 17/49* (2006.01)
*C04B 35/03* (2006.01)

(52) U.S. Cl. ...................... 313/587; 501/108; 313/567; 313/582; 313/586

(58) Field of Classification Search ...................... None
See application file for complete search history.

(56) References Cited

U.S. PATENT DOCUMENTS

| | | | | |
|---|---|---|---|---|
| 6,995,104 | B2 * | 2/2006 | Park et al. | 501/108 |
| 7,138,350 | B2 * | 11/2006 | Sakurai et al. | 501/108 |
| 7,218,050 | B2 * | 5/2007 | Hasegawa et al. | 313/587 |
| 7,253,561 | B2 * | 8/2007 | Kim et al. | 313/587 |
| 7,528,547 | B2 * | 5/2009 | Kim | 313/587 |
| 2002/0044106 | A1 | 4/2002 | Iseki | |
| 2004/0070341 | A1 * | 4/2004 | Chul Park | 313/582 |
| 2004/0131884 | A1 | 7/2004 | Park et al. | |

(Continued)

FOREIGN PATENT DOCUMENTS

CN 1617946 5/2005

(Continued)

OTHER PUBLICATIONS

English Abstract for Korean Patent Application No. 1999-24358.

(Continued)

*Primary Examiner*—Nimeshkumar D. Patel
*Assistant Examiner*—Natalie K Walford
(74) *Attorney, Agent, or Firm*—Knobbe Martens Olson & Bear LLP

(57) ABSTRACT

A plasma display device includes: a plasma display panel including an address electrode disposed on a first substrate, a pair of first and second display electrodes disposed on a second substrate and crossing the address electrode, a dielectric layer covering the first and second display electrodes on the second substrate, an MgO protective layer covering the dielectric layer on the second substrate, and discharge gases filled between the first and second substrates; a driver that drives the plasma display panel; and a controller that controls a sustain pulse width of a sustain period to be 1 to 3.5 μs. The MgO protective layer includes 100 to 300 ppm of Ca, 100 to 250 ppm of Al, 10 to 50 ppm of Fe, and 70 to 170 ppm of Si based on MgO. The plasma display device shows improved discharge stability and display quality due to reduced discharge delay time (Ts).

12 Claims, 4 Drawing Sheets

U.S. PATENT DOCUMENTS

| | | | | |
|---|---|---|---|---|
| 2005/0264211 | A1 | 12/2005 | Kim | |
| 2005/0288169 | A1 | 12/2005 | Lee et al. | |
| 2008/0088532 | A1 * | 4/2008 | Kim | 345/60 |
| 2008/0231190 | A1 * | 9/2008 | Kim | 313/587 |
| 2008/0231553 | A1 * | 9/2008 | Kim | 345/60 |
| 2008/0252215 | A1 * | 10/2008 | Kim | 313/587 |
| 2008/0291128 | A1 * | 11/2008 | Kim | 345/60 |

FOREIGN PATENT DOCUMENTS

| | | |
|---|---|---|
| EP | 1 408 528 | 4/2004 |
| EP | 1 482 068 | 12/2004 |
| JP | 07-134565 | 5/1995 |
| JP | 11-312469 | 11/1999 |
| KR | 10-258913 | 3/2000 |
| KR | 2001-91151 | 10/2001 |
| KR | 2004-21190 | 3/2004 |
| KR | 2004-32668 | 4/2004 |
| KR | 2005-12472 | 2/2005 |
| KR | 2005-39240 | 4/2005 |
| KR | 2005-113685 | 12/2005 |
| KR | 2006-80500 | 7/2006 |

OTHER PUBLICATIONS

U.S. Appl. No. 12/050,315, filed Mar. 18, 2008, Ki-Dong Kim.
U.S. Appl. No. 12/050,332, filed Mar. 18, 2008, Ki-Dong Kim.
U.S. Appl. No. 12/050,342, filed Mar. 18, 2008, Ki-Dong Kim.
U.S. Appl. No. 12/050,356, filed Mar. 18, 2008, Ki-Dong Kim.

* cited by examiner

100

PLASMA DISPLAY DEVICE WITH MAGNESIUM OXIDE (MGO) PROTECTIVE LAYER

CROSS-REFERENCE TO RELATED APPLICATIONS

This application claims the benefit of Korean Application No. 2007-27724 filed Mar. 21, 2007, in the Korean Intellectual Property Office, the disclosure of which is incorporated herein by reference.

BACKGROUND OF THE INVENTION

1. Field of the Invention

Aspects of the present invention relate to a plasma display device. More particularly, the aspects of the present invention relate to a plasma display device that provides improved discharge stability due to a reduced statistical delay time (Ts) and temperature-dependency of the statistical delay time.

2. Description of the Related Art

A plasma display panel is a display device that forms an image by exciting phosphors with vacuum ultraviolet (VUV) rays generated by gas discharge in discharge cells.

A plasma display panel displays text and/or graphics by using light emitted from plasma that is generated by the gas discharge. An image is formed by applying a predetermined level of voltage to two electrodes situated in a discharge space of the plasma display panel to induce plasma discharge between the two electrodes and exciting a phosphor layer that is formed in a predetermined pattern by ultraviolet rays generated from the plasma discharge. (The two electrodes situated in the discharge space of the plasma display panel are hereinafter referred to as the "display electrodes.")

Generally, the plasma display panel includes a dielectric layer that covers the two display electrodes and a protective layer on the dielectric layer to protect the dielectric layer. The protective layer is mainly composed of MgO, which is transparent to allow the visible light to permeate and which exhibits excellent protective performance for the dielectric layer. The protective layer also produces a secondary electron emission. Recently, however, alternatives and modifications for the MgO protective layer have been researched.

The MgO protective layer has a sputtering resistance characteristic that lessens the ionic impact of the discharge gas upon discharge while the plasma display device is driven and protects the dielectric layer. Further, an MgO protective layer in the form of a transparent protective thin film reduces the discharge voltage by emitting secondary electrons. Typically, the MgO protective layer is coated on the dielectric layer in a thickness of 5000 to 9000 Å.

Accordingly, the components and the membrane characteristics of the MgO protective layer significantly affect the discharge characteristics. The membrane characteristics of the MgO protective layer are significantly dependent upon the components and the coating conditions of deposition. It is desirable to develop optimal components for improving the membrane characteristics.

It is desirable to improve the discharge stability of the high-definition plasma display panel (PDP) through an improvement of the response speed. The high-definition plasma display panel should respond to a rapid scan speed such that the stable discharge in which all addressing is performed is established. The speed of the response to rapid scanning is determined by the formative delay time (Tf) and the statistical delay time (Ts).

SUMMARY OF THE INVENTION

One embodiment of the present invention provides a plasma display device that provides improved discharge stability due to a reduced statistical delay time (Ts) and reduced temperature-dependency of the statistical delay time.

According to an embodiment of the present invention, provided is a plasma display device that includes: a plasma display panel including an address electrode disposed on a first substrate, a pair of first and second display electrodes disposed on a second substrate and crossing the address electrode, a dielectric layer covering the first and second display electrodes on the second substrate, an MgO protective layer covering the dielectric layer on the second substrate, and discharge gases filled between the first and second substrates; a driver that drives the plasma display panel; and a controller that controls a sustain pulse width of a sustain period to be 1 to 3.5 μs. The MgO protective layer includes 100 to 300 ppm of Ca, 100 to 250 ppm of Al, 10 to 50 ppm of Fe, and 70 to 170 ppm of Si, by weight, based on the content of MgO.

According to a non-limiting example, the MgO protective layer includes 100 to 300 ppm by weight of Ca based on the content of MgO. According to yet another non-limiting example, the MgO protective layer includes 160 to 180 ppm by weight of Ca based on the content of MgO. According to another non-limiting example, the MgO protective layer includes 100 to 250 ppm by weight of Al based on the content of MgO. According to yet another non-limiting example, the MgO protective layer includes 150 to 220 ppm by weight of Al based on the content MgO. According to another non-limiting example, the MgO protective layer includes 10 to 50 ppm of Fe by weight based on the content of MgO. According to yet non-limiting example, the MgO protective layer includes 20 to 30 ppm of Fe by weight based on the content of MgO. According to another non-limiting example, the MgO protective layer includes 70 to 170 ppm by weight of Si based on the content of MgO. According to yet another non-limiting example, the MgO protective layer includes 90 to 160 ppm by weight of Si based on the content of MgO.

According to an aspect of the present invention, the sustain pulse width is 1 to 3.5 μs. According to a non-limiting example, the sustain pulse width is 1 to 3.0 μs.

According to an aspect of the present invention, the sustain period is 9 to 25 μs. According to a non-limiting example, the sustain period may be 10 to 25 μs.

According to an aspect of the present invention, the first sustain pulse width of the sustain period is 2 to 7.5 μs. According to a non-limiting example, the first sustain pulse width of the sustain period ranges from 2 to 7 μs.

According to an aspect of the present invention, the discharge gas includes 5 to 30 parts by volume of Xe based on 100 parts by volume of Ne. According to a non-limiting example, the discharge gas further includes more than 0 to 70 parts by volume of at least one gas selected from the group consisting of He, Ar, Kr, $O_2$, $N_2$, and combinations thereof based on 100 parts by volume of Ne.

According to another embodiment of the present invention, there is provided a plasma display panel comprising at least one pair of first and second display electrodes disposed on a substrate; a dielectric layer covering the at least one pair of first and second display electrodes; and an MgO protective layer covering the dielectric layer, wherein the MgO protective layer comprises MgO as a main component and Ca, Al, Fe and Si as doping elements.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
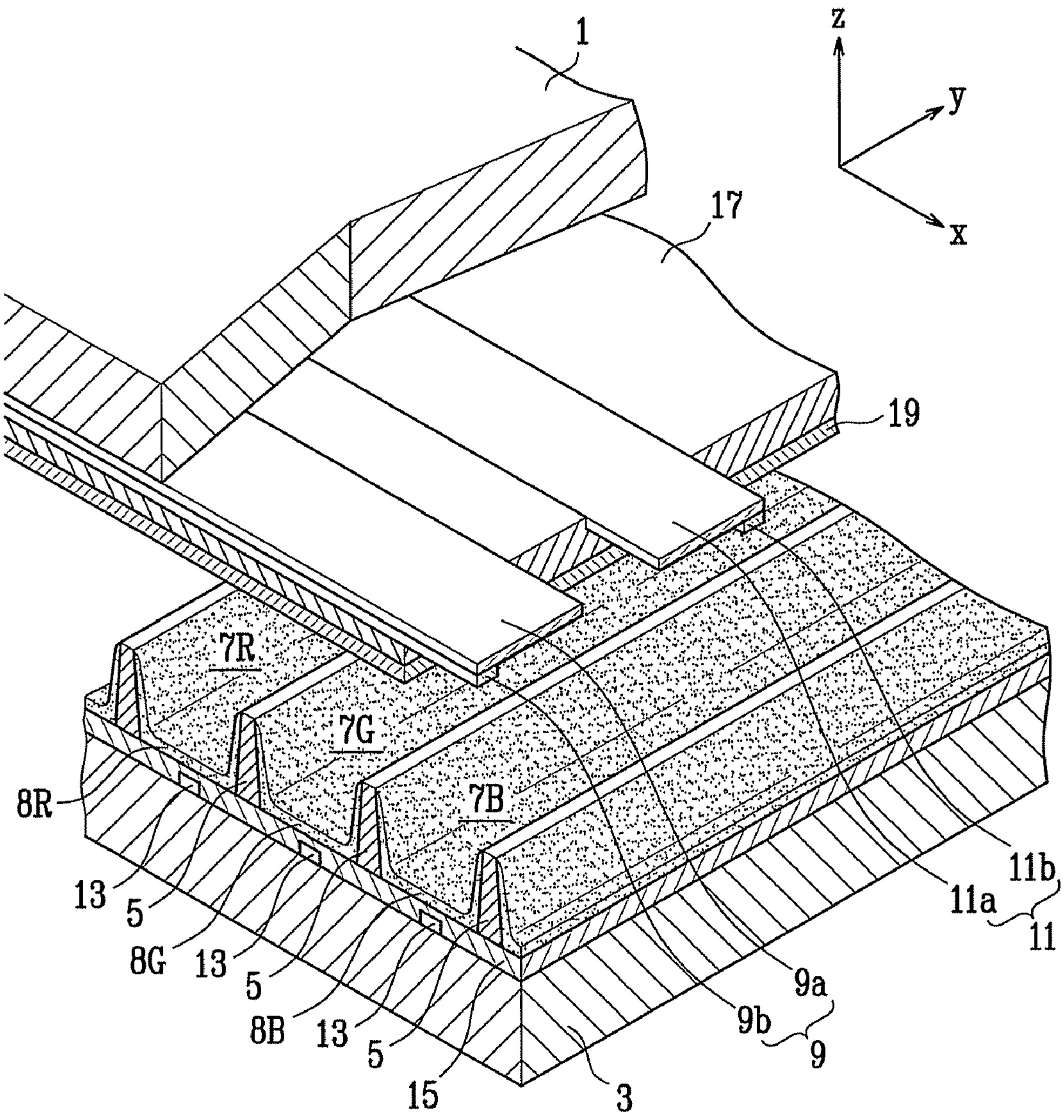
FIG. 1 is a partial exploded perspective view showing a structure of a plasma display panel according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Aspects of the present invention relate to an MgO protective layer that can improve the display quality of a plasma display device.

A plasma display device according to an embodiment of the present invention includes: a plasma display panel including an address electrode disposed on a first substrate, a pair of first and second display electrodes disposed on a second substrate and crossing the address electrode, a dielectric layer covering the first and second display electrodes on the second substrate, an MgO protective layer covering the dielectric layer on the second substrate, and discharge gases filled between the first and second substrates; a driver that drives the plasma display panel; and a controller that controls a sustain pulse width of a sustain period to be 1 to 3.5 μs. The MgO protective layer includes 100 to 300 ppm of Ca, 100 to 250 ppm of Al, 10 to 50 ppm of Fe, and 70 to 170 ppm of Si, by weight based on the content of MgO.

Herein, in general, when it is mentioned that one layer or material is formed on or disposed on or covers a second layer or a second material, it is to be understood that the terms "formed on," "disposed on" and "covering" are not limited to the one layer being formed directly on the second layer, but may include instances wherein there is an intervening layer or material between the one layer and the second layer.

The sustain pulse width is 1 to 3.5 μs. According to a non-limiting example, the sustain pulse width is 1 to 3.0 μs. When the sustain pulse width is 1 to 3.5 μs, the high-definition plasma display device has an improved uniformity of images due to an improved discharge stability.

The sustain period is 9 to 25 μs. According to a non-limiting example, the sustain period may be 10 to 25 μs. When the sustain period is 9 to 25 μs, the high-definition plasma display device has an improved uniformity of images due to an improved discharge stability.

The first sustain pulse width of the sustain period is 2 to 7.5 μs. According a non-limiting example, the first sustain pulse width of the sustain period ranges from 2 to 7 μs.

When the first sustain pulse width of the sustain period is 2 to 7.5 μs, the high-definition plasma display device has an improved uniformity of images due to an improved discharge stability.

The discharge gas includes 5 to 30 parts by volume of Xe based on 100 parts by volume of Ne. According a non-limiting example, the discharge gas includes 7 to 25 parts by volume of Xe based on 100 parts by volume of Ne. When the discharge gas includes Xe and Ne within the above ratio, the discharge initiation voltage is decreased due to an increased ionization ratio of the discharge gas. When the discharge initiation voltage is decreased, the high-definition plasma display device has a decreased power consumption and an increased brightness.

According a non-limiting example, the discharge gas may further include more than 0 to 70 parts by volume of at least one gas selected from the group consisting of He, Ar, Kr, $O_2$, $N_2$, and combinations thereof based on 100 parts by volume of Ne. According to a specific non-limiting example, the discharge gas includes 14 to 65 parts by volume of the gas selected from the group consisting of He, Ar, Kr, $O_2$, $N_2$, and combinations thereof based on 100 parts by volume of Ne. When the discharge gas includes at least one gas selected from the group consisting of He, Ar, Kr, $O_2$, $N_2$, and combinations thereof within the above ratio, the discharge initiation voltage is decreased due to an increased ionization ratio of the discharge gas. When the discharge initiation voltage is decreased, the high-definition plasma display device has decreased power consumption and an increased brightness.

An embodiment of the present invention will hereinafter be described in detail with reference to the accompanying drawings. As those skilled in the art would realize, the described embodiments may be modified in various different ways, all without departing from the spirit or scope of the present invention.

FIG. 1 is a partial exploded perspective view showing the structure of a plasma display panel according to one embodiment. Referring to the drawing, the PDP includes a first substrate 3, a plurality of address electrodes 13 disposed in one direction (a Y direction in the drawing) on the first substrate 3, and a first dielectric layer 15 disposed on the surface of the first substrate 3 covering the address electrodes 13. Barrier ribs 5 are formed on the first dielectric layer 15, and red (R), green (G), and blue (B) phosphor layers 8R, 8G, and 8B are disposed in discharge cells 7R, 7G, and 7B formed between the barrier ribs 5.

The barrier ribs 5 may be formed in any shape as long as their shape can partition the discharge space, and the barrier ribs 5 may have diverse patterns. For example, the barrier ribs 5 may be formed as an open type, such as stripes, or as a closed type, such as a waffle, matrix, or delta shape. As further non-limiting examples, closed-type barrier ribs may be formed such that a horizontal cross-section of the discharge space is a polygon such as a quadrangle, triangle, or pentagon, or a circle or an oval.

Display electrodes 9 and 11, each including a pair of a transparent electrodes 9*a* or 11*a* and a bus electrode 9*b* or 11*b*, are disposed in a direction crossing the address electrodes 13 (an X direction in the drawing) on one surface of a second substrate 1 facing the first substrate 3. Also, a second dielectric layer 17 and an MgO protective layer 19 are disposed on the surface of the second substrate 1 while covering the display electrodes.

The MgO protective layer 19 includes 100 to 300 ppm of Ca, 100 to 250 ppm of Al, 10 to 50 ppm of Fe, and 70 to 170 ppm of Si. In referring herein to the MgO protective layer, all ppm values are by weight based on the MgO content.

Discharge cells are formed at positions where the address electrodes 13 of the first substrate 3 are crossed by the display electrodes of the second substrate 1.

The discharge cells between the first substrate 3 and the second substrate 1 are filled with a discharge gas. As discussed above, the discharge gas includes 5 to 30 parts by volume of Xe based on 100 parts by volume of Ne. According a non-limiting example, the discharge gas includes 7 to 25 parts by volume of Xe based on 100 parts by volume of Ne. The discharge gas may further include 0 to 70 parts by volume of at least one gas selected from the group consisting of He, Ar, Kr, $O_2$, $N_2$, and combinations thereof based on 100 parts by volume of Ne. According to a non-limiting example, the discharge gas includes 14 to 65 parts by volume of the gas selected from the group consisting of He, Ar, Kr, $O_2$, $N_2$, and combinations thereof based on 100 parts by volume of Ne.

Figure 2:
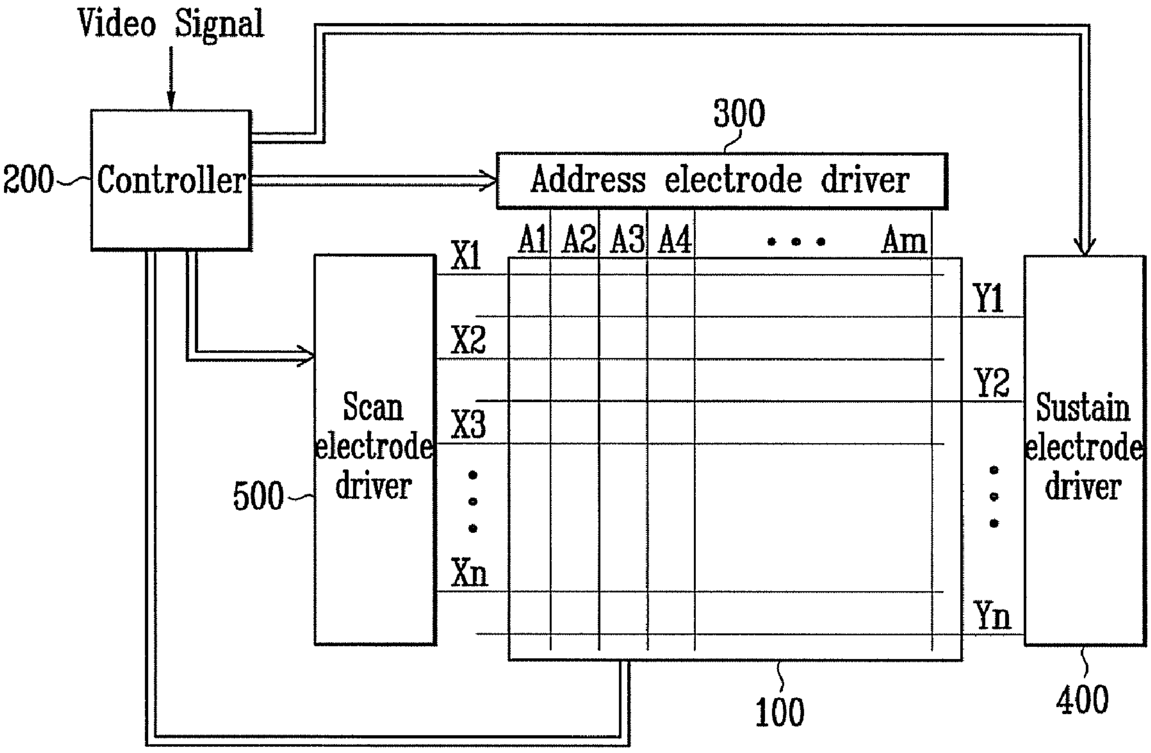
FIG. 2 is a schematic view showing a plasma display device including the plasma display panel of FIG. 1.

FIG. 2 is a schematic view showing a plasma display device according to an embodiment of the present invention.

As shown in FIG. 2, the plasma display device according to one embodiment of the present invention includes a plasma display panel 100, a controller 200, an address electrode (A) driver 300, a sustain electrode (a second display electrode, X) driver 400, and a scan electrode (a first display electrode, Y) driver 500.

The plasma display panel 100 has the same structure as shown in FIG. 1.

The controller 200 receives video signals from the outside and outputs an address driving control signal, a sustain (X) electrode driving control signal, and a scan (Y) electrode driving control signal. The controller 200 divides one frame into a plurality of subfields, and each subfield is composed of a reset period, an address period, and a sustain period when the subfield is expressed based on temporal driving change.

The address driver 300 receives an address (A) electrode driving control signal from a controller 200, and applies a display data signal for selecting a discharge cell to be displayed to each address electrode.

A sustain electrode driver 400 receives a sustain electrode driving control signal from the controller 200, and applies a driving voltage to the sustain (X) electrodes.

A scan electrode driver 500 receives a scan electrode driving control signal from the controller 200 and applies a driving voltage to the scan electrodes.

Figure 3:
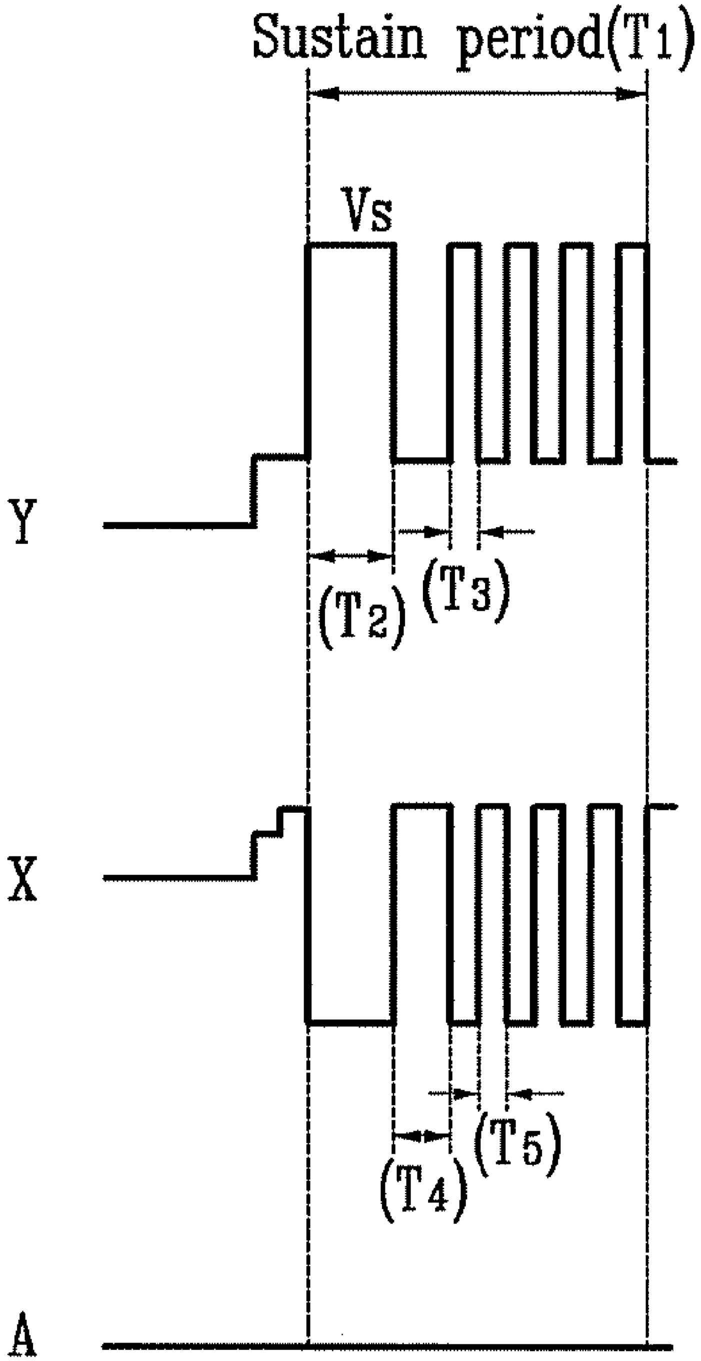
FIG. 3 shows a driving waveform of the plasma display device according to FIG. 2.

FIG. 3 shows a driving waveform of the plasma display panel illustrated in FIG. 2. As shown in FIG. 3, the first sustain discharge pulse of the Vs voltage at the sustain period ($T_1$) is applied to the scan electrode (Y) and the sustain electrode (X), alternately. If the wall voltage between the scan (Y) electrode and the sustain electrode (X) is generated, the scan (Y) electrode and the sustain (X) electrode are discharged by the wall voltage and the Vs voltage. Then, the process to apply the scan (Y) electrode with the sustain discharge pulse of the Vs voltage and the process to apply the sustain discharge pulse of the Vs voltage to the sustain (X) electrode are repeated a number of times corresponding to the weighted value indicated by subfield.

Herein, the first sustain pulse width ($T_2$) of the scan electrode (Y) or the first sustain discharge pulse width ($T_4$) of the sustain period (X) is 9 to 25 μs. According to a non-limiting example, the first sustain pulse width ($T_2$) of the scan electrode (Y) or the first sustain discharge pulse width ($T_4$) of the sustain period (X) ranges from 10 to 25 μs. The sustain discharge pulse width ($T_3$) of the scan electrode (Y) or the sustain discharge pulse width ($T_5$) of the sustain electrode (X) is 1 to 3.5 μs. According to a non-limiting example, the sustain discharge pulse width ($T_3$) of the scan electrode (Y) or the sustain discharge pulse width ($T_5$) of the sustain electrode (X) ranges from 1 to 3.0 μs. The sustain period ($T_1$) is 9 to 25 μs. According to a non-limiting example, the sustain period ($T_1$) ranges from 10 to 25 μs.

The plasma display panel is driven by the driving waveform, and includes the discharge gas filled therein and an MgO protective layer including specific doping elements. The plasma display panel implements improved driving stability, discharge characteristics, and a display quality. The discharge incapability at certain cells that are incapable of lighting can be also controlled. The doping elements include Ca, Al, Fe, and Si, which improve the discharge stability by synergetic interactions.

According to one embodiment of the present invention, the MgO protective layer of the plasma display device includes MgO as a base material and Ca, Al, Fe, and Si as doping elements.

According to a non-limiting example, the MgO protective layer includes 100 to 300 ppm of Ca based on the content of MgO. According to yet another non-limiting example, the MgO protective layer includes 160 to 180 ppm of Ca based on the content of MgO. When the Ca content is within the above range, discharge delay time is very short. Therefore, when the Ca content is less than 100 ppm or more than 300 ppm, discharge delay time may be increased.

According to a non-limiting example, the MgO protective layer includes 100 to 250 ppm of Al based on the content of MgO. According to a non-limiting example, the MgO protective layer includes 150 to 220 ppm of Al based on the content of MgO. Since the Al content can control the discharge delay time, an appropriate discharge delay time may not be realized when the Al content is out of the described range.

According a non-limiting example, the MgO protective layer includes 10 to 50 ppm of Fe based on the content of MgO. According to a specific, non-limiting example, the MgO protective layer includes 20 to 30 ppm of Fe based on the content of MgO. Since the Fe content can also control the discharge delay time, an appropriate discharge delay time may not be realized when the Fe content is out of the described range.

According to a non-limiting example, the MgO protective layer includes 70 to 170 ppm of Si based on the content of MgO. According to a specific, non-limiting example, the MgO protective layer includes 90 to 160 ppm of Si based on the content of MgO. When the Si content is within the above range, discharge delay time is very short. Therefore, when the Si content is less than 70 ppm or more than 170 ppm, the discharge delay time may be increased.

The method of fabricating the plasma display device is well known to persons skilled in this art, so a detailed description thereof will be omitted from this specification. However, the process for forming the MgO protective layer according to one embodiment of the present invention will be described.

The MgO protective layer covers the surface of the dielectric layer covering the display electrodes in the plasma display device to protect the dielectric layer from the ionic impact of the discharge gas during the discharge. The MgO protective layer is mainly composed of MgO, which has sputtering-resistance and a high secondary electron emission coefficient.

The depositing material for the MgO protective layer can be formed into a pellet shape. It is desirable to optimize the size and the shape of the pellets. According to one embodiment of the present invention, the specified quantities of the doping elements Ca, Al, Fe, and Si are added during preparation of a sintered MgO material or during the preparation of the raw materials.

The content of Ca added to the MgO material used to form the MgO protective layer is controlled so that the Ca content in the MgO protective layer ranges from 100 to 300 ppm, or, as a more specific, non-limiting example, from 160 to 180 ppm based on the content of MgO. The content of Al added to the MgO material used to form the MgO protective layer is controlled so that the Al content in the MgO protective layer ranges from 100 to 250 ppm or, as a more specific, non-limiting example, from 150 to 220 ppm based on the content of MgO. The content of Fe added to the MgO material is controlled so that the Fe content in the MgO protective layer ranges from 10 to 50 ppm or, as a more specific, non-limiting example, from 20 to 30 ppm based on the content of MgO. The content of Si added in the MgO material used to form the MgO protective layer is controlled so that the Si content in the MgO protective layer ranges from 70 to 170 ppm or, as a more specific, non-limiting example, from 90 to 160 ppm based on the content of MgO.

The protective layer may be formed by a thick-film printing method utilizing a paste. However, a layer formed by the thick-film printing method has relative disadvantages in that the layer is weak against sputtering by ion bombardment and cannot reduce a discharge sustain voltage and a discharge firing voltage by secondary electron emission. Therefore, the protective layer is preferably formed by physical vapor deposition.

The method of forming the MgO protective layer by physical vapor deposition is preferably a plasma deposition method. Plasma deposition methods include methods using electron beams, deposition beams, ion plating, or magnetron sputtering.

Further, since the MgO protective layer is contacted with the discharge gas, the components and the membrane characteristics thereof significantly affect the discharge characteristics. The MgO protective layer characteristic is significantly dependent upon the components and the coating conditions during deposition. The coating conditions should be chosen such that the MgO protective layer has the required membrane characteristics.

The following examples illustrate aspects of the present invention in more detail. However, it is understood that the present invention is not limited by these examples.

Manufacture of a Plasma Display Device

COMPARATIVE EXAMPLE 1

Display electrodes having a stripe shape were formed on a soda lime glass substrate in accordance with a conventional process.

A glass paste was coated on the substrate formed with the display electrodes and fired to provide a second dielectric layer.

An MgO protective layer was formed on the second dielectric layer by ion plating using an MgO powder and doping elements of Ca, Al, Fe, and Si to fabricate a second substrate. The Ca content was 15 ppm, the Al content was 10 ppm, the Fe content was 10 ppm, and the Si content was 50 ppm relative to the MgO weight. A plasma display device was manufactured using the fabricated the second substrate.

COMPARATIVE EXAMPLE 2

A plasma display device was manufactured according to the same method as in Comparative Example 1, except that the Ca content was 240 ppm, the Al content was 80 ppm, the Fe content was 65 ppm, and the Si content was 60 ppm relative to the MgO weight.

COMPARATIVE EXAMPLE 3

A plasma display device was manufactured according to the same method as in Comparative Example 1, except that the Ca content was 420 ppm, the Al content was 260 ppm, the Fe content was 77 ppm, and the Si content was 300 ppm relative to the MgO weight.

COMPARATIVE EXAMPLE 4

A plasma display device was manufactured according to the same method as in Comparative Example 1, except that the Ca content was 10 ppm, the Al content was 20 ppm, the Fe content was 15 ppm, and the Si content was 100 ppm relative to the MgO weight.

COMPARATIVE EXAMPLE 5

A plasma display device was manufactured according to the same method as in Comparative Example 1, except that the Ca content was 320 ppm, the Al content was 250 ppm, the Fe content was 30 ppm, and the Si content was 300 ppm relative to the MgO weight.

COMPARATIVE EXAMPLE 6

A plasma display device was manufactured according to the same method as in Comparative Example 1, except that the Ca content was 180 ppm, the Al content was 75 ppm, the Fe content was 60 ppm, and the Si content was 180 ppm relative to the MgO weight.

EXAMPLE 1

A plasma display device was manufactured according to the same method as in Comparative Example 1, except that the Ca content was 100 ppm, the Al content was 200 ppm, the Fe content was 25 ppm, and the Si content was 110 ppm relative to the MgO weight. The sustain pulse width of a sustain period was 2.1 μs, the sustain period was 15 μs, and the first sustain pulse width of the sustain period was 2.1 μs. Also, the discharge gas included 11 parts by volume of Xe and 35 parts by volume of He based on 100 parts by volume of Ne.

EXAMPLE 2

A plasma display device was manufactured according to the same method as in Comparative Example 1, except that the Ca content was 300 ppm, the Al content was 200 ppm, the Fe content was 25 ppm, and the Si content was 110 ppm relative to the MgO weight.

EXAMPLE 3

A plasma display device was manufactured according to the same method as in Comparative Example 1, except that the Ca content was 170 ppm, the Al content was 100 ppm, the Fe content was 25 ppm, and the Si content was 110 ppm relative to the MgO weight.

EXAMPLE 4

A plasma display device was manufactured according to the same method as in Comparative Example 1, except that the Ca content was 170 ppm, the Al content was 250 ppm, the Fe content was 25 ppm, and the Si content was 110 ppm relative to the MgO weight.

EXAMPLE 5

A plasma display device was manufactured according to the same method as in Comparative Example 1, except that the Ca content was 170 ppm, the Al content was 200 ppm, the Fe content was 10 ppm, and the Si content was 110 ppm relative to the MgO weight.

EXAMPLE 6

A plasma display device was manufactured according to the same method as in Comparative Example 1, except that the Ca content was 170 ppm, the Al content was 200 ppm, the Fe content was 50 ppm, and the Si content was 110 ppm relative to the MgO weight.

EXAMPLE 7

A plasma display device was manufactured according to the same method as in Comparative Example 1, except that the Ca content was 170 ppm, the Al content was 200 ppm, the Fe content was 25 ppm, and the Si content was 70 ppm relative to the MgO weight.

EXAMPLE 8

A plasma display device was manufactured according to the same method as in Comparative Example 1, except that the Ca content was 170 ppm, the Al content was 200 ppm, the Fe content was 25 ppm, and the Si content was 170 ppm relative to the MgO weight.

EXAMPLE 9

A plasma display device was manufactured according to the same method as in Comparative Example 1, except that the Ca content was 170 ppm, the Al content was 200 ppm, the Fe content was 25 ppm, and the Si content was 110 ppm relative to the MgO weight.

Measurement of Statistical Delay Time of Plasma Display Device

Statistical delay times (response speeds) depending on temperature of the plasma display devices according to Comparative Examples 1 to 6 and Examples 1 to 9 were measured. The measurement results for Comparative Examples 1 to 6 and Example 9 are shown in FIG. 4.

MgO is sensitive to external temperature variations. In order to evaluate how the contents of the doping elements Ca, Al, Fe, and Si can reduce the temperature sensitivity of the MgO, the plasma display devices were driven at a low temperature (−10° C.), room temperature (25° C.), and a high temperature (60° C.), and the response speed was measured at each temperature.

Figure 4:
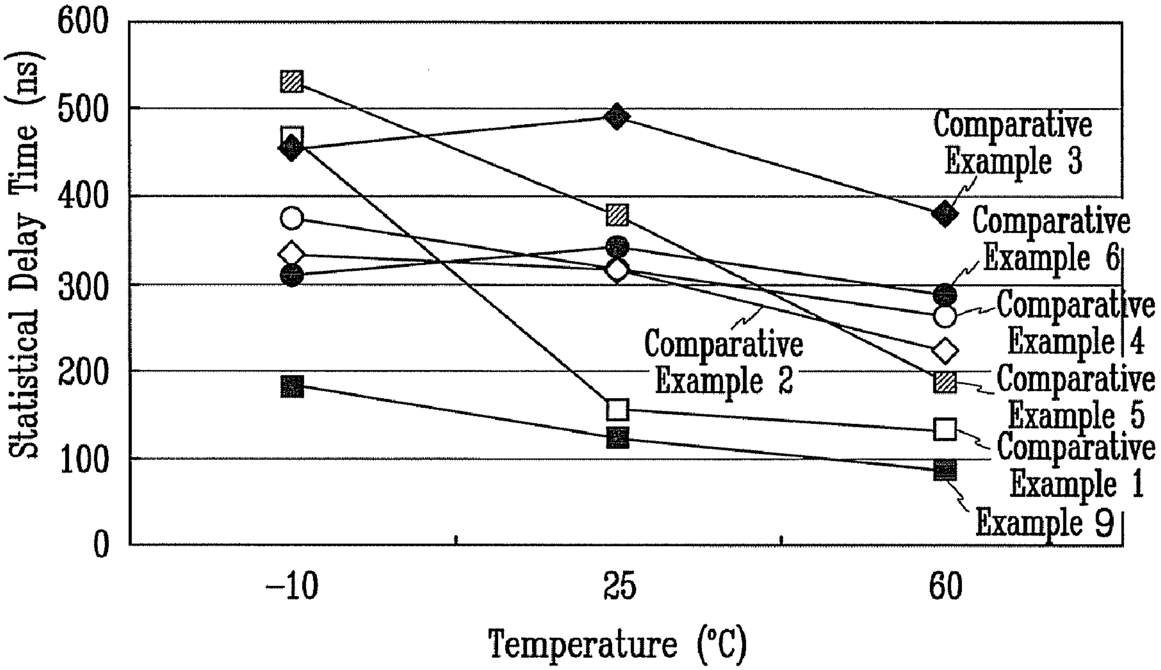
FIG. 4 is a graph showing a statistical delay time (Ts) depending on temperature of plasma display devices according to Comparative Examples 1 to 6 and Example 9.

As shown in FIG. 4, a plasma display device having the amounts of Ca, Al, Fe, and Si specified in Example 9 showed a higher response speed than the plasma display devices of Comparative Examples 1 to 6, and thereby minimized temperature dependency. Plasma display devices according to examples 1 to 8 also showed similar results to that of Example 9. According to these examples, the MgO protective layer has a minimal temperature dependency and therefore the discharge stability of a plasma display device can be improved.

As described above, a high-definition plasma display device includes an MgO protective layer containing a predetermined amount of Ca, Al, Fe, and Si as doping elements, and thereby implements improved discharge stability due to reduced statistical delay time ($T_s$) and temperature-dependency of the statistical delay time.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A plasma display device comprising:
a plasma display panel comprising
at least one pair of first and second display electrodes disposed on a substrate;
a dielectric layer covering the at least one pair of first and second display electrodes; and
an MgO protective layer covering the dielectric layer;
a driver that drives the plasma display panel; and
a controller that controls a sustain pulse width of a sustain period to be 1 to 3.5 μs,
wherein the MgO protective layer comprises 100 to 300 ppm of Ca, 100 to 250 ppm of Al, 10 to 50 ppm of Fe, and 70 to 170 ppm of Si, by weight, based on a content of MgO.

2. The plasma display device of claim 1, wherein the MgO protective layer comprises 160 to 180 ppm by weight of Ca based on the content of MgO.

3. The plasma display device of claim 1, wherein the MgO protective layer comprises 150 to 220 ppm by weight of Al based on the content of MgO.

4. The plasma display device of claim 1, wherein the MgO protective layer comprises 20 to 30 ppm of Fe by weight based on the content of MgO.

5. The plasma display device of claim 1, wherein the MgO protective layer comprises 90 to 160 ppm by weight of Si based on the content of MgO.

6. The plasma display device of claim 1, wherein the sustain pulse width is 1 to 3.0 μs.

7. The plasma display device of claim 1, wherein the sustain period is 9 to 25 μs.

8. The plasma display device of claim 7, wherein the sustain period ranges from 10 to 25 μs.

9. The plasma display device of claim 1, wherein the first sustain pulse width of the sustain period is 2 to 7.5 μs.

10. The plasma display device of claim 9, wherein the first sustain pulse width of the sustain period is 2 to 7 μs.

11. The plasma display device of claim 1, wherein the plasma display panel further comprises a discharge gas including 5 to 30 parts by volume of Xe based on 100 parts by volume of Ne.

12. The plasma display device of claim 11, wherein the discharge gas further comprises more than 0 to 70 parts by volume of at least one gas selected from the group consisting of He, Ar, Kr, $O_2$, $N_2$, and combinations thereof based on 100 parts by volume of Ne.

* * * * *